(12) United States Patent
Tarighat Mehrabani et al.

(10) Patent No.: US 9,979,575 B2
(45) Date of Patent: May 22, 2018

(54) DISTRIBUTED DYNAMIC CONFIGURATION OF A SCALABLE RADIO FREQUENCY COMMUNICATION SYSTEM

(71) Applicant: Avago Technologies General IP (Singapore) Pte. Ltd., Singapore (SG)

(72) Inventors: Alireza Tarighat Mehrabani, Irvine, CA (US); Payam Torab Jahromi, Laguna Niguel, CA (US); Brima Babatunde Ibrahim, Laguna Hills, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days. days.

(21) Appl. No.: 15/803,724

(22) Filed: Nov. 3, 2017

(65) Prior Publication Data

US 2018/0062892 A1    Mar. 1, 2018

Related U.S. Application Data

(62) Division of application No. 14/952,863, filed on Nov. 25, 2015, now Pat. No. 9,843,465.

(Continued)

(51) Int. Cl.
*H04L 27/18*    (2006.01)
*H04W 76/04*    (2009.01)
(Continued)

(52) U.S. Cl.
CPC .......... *H04L 27/18* (2013.01); *H04B 7/0408* (2013.01); *H04W 16/28* (2013.01); *H04W 52/38* (2013.01);
(Continued)

(58) Field of Classification Search
CPC .. H04B 15/00; H04B 1/44; H04B 2001/0433; H04B 7/0682; H04B 7/0408;
(Continued)

(56) References Cited

U.S. PATENT DOCUMENTS 6,633,190 B1 * 10/2003 Alvandpour .............. G06F 1/04
                                                            327/149
7,974,596 B2    7/2011 Lim et al.
(Continued)

OTHER PUBLICATIONS

Hur et al., "Millimeter Wave Beamforming for Wireless Backhaul and Access in Small Cell Networks," IEEE Transactions on Communications, vol. 61, No. 10, Oct. 2013, pp. 4391-4403.
(Continued)

*Primary Examiner* — Bobbak Safaipour
(74) *Attorney, Agent, or Firm* — McDermott Will & Emery LLP

(57) ABSTRACT

A device implementing a distributed dynamic configuration of a scalable radio frequency communication system includes a primary radio frequency (RF) integrated circuit (RFIC) and at least one secondary RFIC. The primary RFIC includes at least one phase shifter, and the primary RFIC may be configured to apply a first phase shift to an RF signal using the at least one first phase shifter, and to transmit the RF signal to at least one secondary RFIC. The at least one secondary RFIC includes at least one second phase shifter, and the at least one secondary RFIC may be configured to apply a second phase shift to the RF signal using the at least one second phase shifter, and to transmit the RF signal via at least one antenna element. The first and second phase shifts may be received by the primary RFIC from a baseband processor.

20 Claims, 8 Drawing Sheets

Related U.S. Application Data

(60) Provisional application No. 62/085,011, filed on Nov. 26, 2014, provisional application No. 62/152,759, filed on Apr. 24, 2015.

(51) Int. Cl.
*H04B 7/0408* (2017.01)
*H04W 16/28* (2009.01)
*H04W 52/38* (2009.01)
*H04B 7/06* (2006.01)
*H04W 88/08* (2009.01)

(52) U.S. Cl.
CPC .......... *H04W 76/046* (2013.01); *H04B 7/063* (2013.01); *H04W 88/085* (2013.01)

(58) Field of Classification Search
CPC ...... H04B 7/063; H04W 16/28; H04W 52/38; H04W 76/046; H04W 88/085
See application file for complete search history.

(56) References Cited

U.S. PATENT DOCUMENTS

| | | | |
|---|---|---|---|
| 8,553,821 B1 | 10/2013 | Eliaz | |
| 9,843,465 B2* | 12/2017 | Tarighat Mehrabani | H04W 76/046 |
| 2011/0069605 A1 | 3/2011 | Laudel et al. | |
| 2012/0028690 A1 | 2/2012 | Liu | |
| 2012/0328036 A1* | 12/2012 | Chang | H01Q 1/2258 |
| | | | 375/267 |
| 2014/0022125 A1* | 1/2014 | Zhu | H01Q 3/2611 |
| | | | 342/377 |
| 2014/0204902 A1* | 7/2014 | Maltsev | H04W 36/0083 |
| | | | 370/331 |
| 2014/0206368 A1* | 7/2014 | Maltsev | H04W 72/0406 |
| | | | 455/450 |
| 2014/0308892 A1* | 10/2014 | Lee | H04B 7/1858 |
| | | | 455/9 |
| 2015/0035607 A1* | 2/2015 | Takenaka | H03F 3/21 |
| | | | 330/297 |
| 2016/0134412 A1* | 5/2016 | Zimmerman | H04L 5/08 |
| | | | 370/297 |
| 2016/0150542 A1* | 5/2016 | Tarighat Mehrabani | H04W 16/28 |
| | | | 370/329 |
| 2016/0150591 A1* | 5/2016 | Tarighat Mehrabani | H04W 76/046 |
| | | | 370/329 |
| 2016/0156490 A1* | 6/2016 | Tarighat Mehrabani | H04W 76/046 |
| | | | 455/23 |
| 2016/0241212 A1* | 8/2016 | Gore | H04B 1/16 |
| 2016/0308563 A1 | 10/2016 | Ouyang et al. | |

OTHER PUBLICATIONS

"Small Cell Millimeter Wave Mesh Backhaul—The First Step for Millimeter Wave Hotspot Deployments," InterDigital Whitepaper, Feb. 2013, 24 pages.

* cited by examiner

DISTRIBUTED DYNAMIC CONFIGURATION OF A SCALABLE RADIO FREQUENCY COMMUNICATION SYSTEM

CROSS-REFERENCE TO RELATED APPLICATIONS

This application is a divisional application of U.S. application Ser. No. 14/952,863, entitled "Distributed Dynamic Configuration of a Scalable Radio Frequency Communication System," filed Nov. 25, 2015, now issued as U.S. Pat. No. 9,843,465, which claims the benefit of U.S. Provisional Application No. 62/085,011, entitled "Scalable and Modular RF Solution for High Performance mmWave Communications," filed on Nov. 26, 2014, and U.S. Provisional Application No. 62/152,759, entitled "Scalable and Modular RF Solution for High Performance mmWave Communications," filed on Apr. 24, 2015, all of which are hereby incorporated by reference in their entireties for all purposes.

TECHNICAL FIELD

The present description relates generally to a scalable radio frequency communication system, including a distributed dynamic configuration of a scalable radio frequency communication system.

BACKGROUND

Millimeter wavelength (mmWave) applications in consumer electronics typically benefit from lower power and cost in exchange for lower performance (e.g., shorter range). On the other end of the spectrum, backhaul mmWave applications may have high performance requirements in terms of range and coverage but can tolerate higher power consumption and cost. For example, backhaul mmWave applications may require a large number of antenna elements, such as 50 or more antenna elements.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
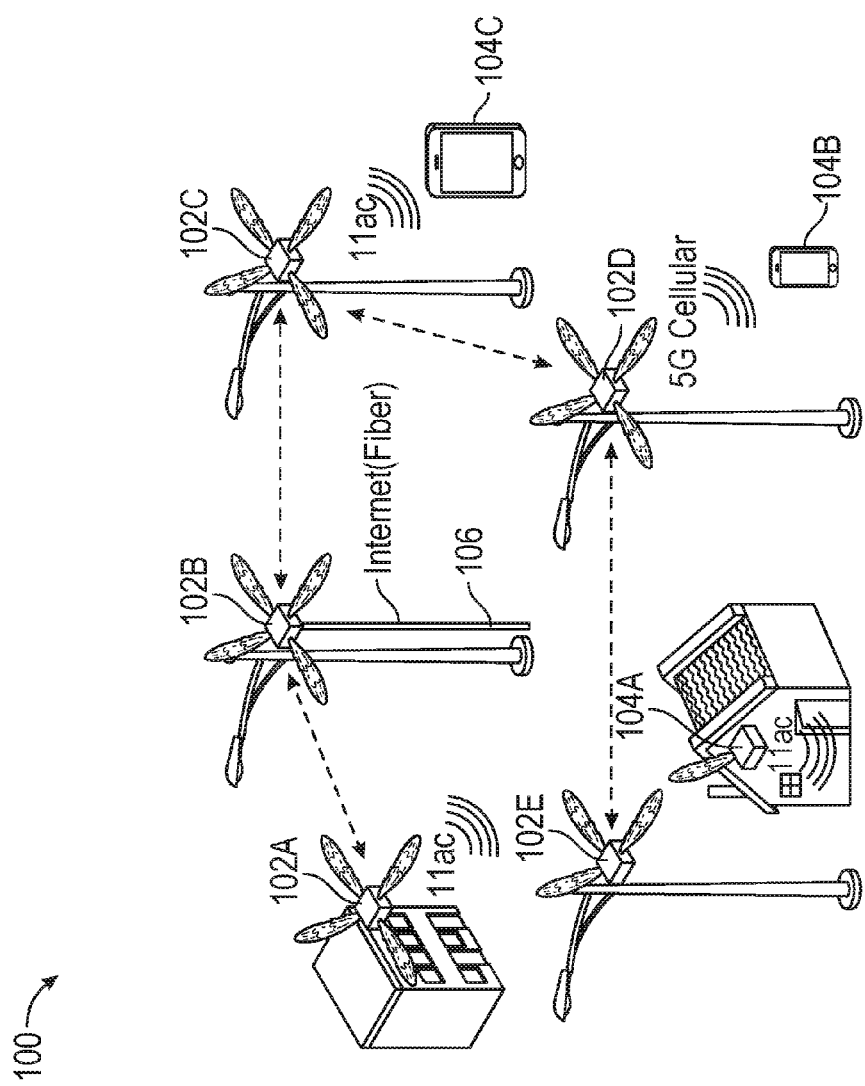
FIG. 1 illustrates an example network environment in which a distributed dynamic configuration of a scalable radio frequency communication system may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject system for distributed dynamic configuration of a scalable radio frequency (RF) communication system includes a primary RFIC and multiple secondary RFICs that may be arranged in a cascaded (or tiled) fashion with each of the secondary RFICs including a given number of antenna elements. The primary RFIC receives an intermediate frequency (IF) signal from a baseband processor, upconverts the IF signal to an RF signal, phase shifts and amplifies the RF signal, and transmits the RF signal to each of the secondary RFICs for transmission via the antenna elements. The secondary RFICs each receive the RF signal from the primary RFIC, amplify and phase shift the RF signal, e.g. to implement beamforming, and transmit the RF signal via the antenna elements.

In a cascaded scalable radio frequency (RF) communication system, different tracing lengths may cause variable delays between the primary RFIC to the secondary RFICs. The variable delays may impact synchronized operations between the secondary RFICs, such as, for example, phase shifting. Unsynchronized phase shifter shifting may result in transient pattern variations that can cause performance degradation and/or other undesirable effects. In the subject system, the variable path delay is compensated for by applying corrective factors to the phase shifters of the secondary RFICs. The path delay may be pre-determined from the design layout and/or may be determined by loop-back or other similar feedback mechanisms. In one or more implementations, the phase for any given secondary RFIC can be matched mid-channel (or any other suitable operating point) and any residual error can be corrected at a pre-distortion stage. The subject system also ensures synchronization of the secondary RFICs (accounting for any variable path delay) by having the primary RFIC provide a common clock signal to each of the secondary RFICs.

In the subject system, phase shifting and/or automatic gain control (AGC) can be configured/set at multiple levels within the cascaded architecture. For example, a first stage of phase shifting, such as coarse or fine resolution phase shifting, e.g. in step size, phase range, and/or accuracy, is performed at a first level of the cascaded architecture at the primary RFIC, and a second stage of phase shifting, such as coarse or fine resolution phase shifting, is performed at a second level of the cascaded architecture at each of the secondary RFICs. Since fine resolution phase shifters may be more expensive, e.g. in terms of cost, power, and/or surface area, the subject system may perform fine resolution phase shifting at the primary RFIC, e.g. once per secondary RFIC, and the coarse resolution phase shifting at the secondary RFICs, e.g. multiple times per secondary RFIC. Furthermore, by using fine resolution phase shifters in the primary RFIC, the directional beams can be finely adjusted from the primary RFIC, minimizing the relay of control signals/information to the secondary RFICs, which may result in switching delay. Accordingly, the subject system provides dynamic range for phase shifting in the cascaded architecture, which generally reduces the complexity (e.g., granularity, resolution) of the phase shifter elements at each stage.

In the context of multi-stage AGC setting in the subject system, the gain stages of the secondary RFICs may be configured in conjunction with the gain setting of the primary RFIC, e.g. on the receive and/or transmit paths. The phase shifters of the secondary RFICs are utilized for providing additional gain control within the secondary RFICs to ensure the proper dynamic range for signals at the RF inputs of the primary RFIC, e.g. on the receive path. Furthermore, the phase shifters may be used as high-resolution amplifiers/attenuators for equal gain combining on the receive path. In this manner, the secondary RFICs may facilitate equal gain combining at the primary RFIC, e.g. by offsetting any significant mismatches between RF inputs at the primary RFIC.

FIG. 1 illustrates an example network environment 100 in which a distributed dynamic configuration of a scalable radio frequency communication system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes one or more base station devices 102A-E and one or more user devices 104A-C. One or more of the base station devices 102A-E, such as the base station device 102B, may be coupled to a network, such as the Internet, via a transmission media 106, such as a fiber optic transmission media. In one or more implementations, the transmission media 106 may be shared by tens, hundreds, thousands, or any number of base station devices 102A-E and/or nodes. The base station devices 102A-E utilize one or more wireless communication technologies, such as mmWave technologies, to communicate with another, e.g. via backhaul communications. For example, the base station devices 102A,C-E may utilize backhaul communications to access/share the network connection of the base station device 102B, e.g. via the transmission media 106. The base station devices 102A-E may be arranged in a star topology, a ring topology, a mesh topology, or generally any network topology through which backhaul communications may be implemented.

The base station devices 102A-E also communicate with one or more of the user devices 104A-C using one or more wireless communication technologies, such as Wi-Fi (802.11ac, 802.11ad, etc.), cellular (3G, 4G, 5G, etc.), mmWave, etc. For example, the base station devices 102A,C may communicate with one or more of the user devices 104A-C using 802.1ac communications, while the base station device 102D may communication with one or more of the user devices 104A-C using 5G cellular communications. In one or more implementations, the base station devices 102A-E may have a small form factor, such as five inches by five inches by five inches (height by width by depth), and may be mounted, for example, on telephone poles and/or other municipal infrastructure. Thus, the base station devices 102A-E may be used to provide low-cost municipal Wi-Fi, e.g. nodes utilizing 802.11ac technology and/or communicating over unlicensed bands, for providing 4G/5G small cell backhauling, and/or for providing broadband and fiber to homes and/or dwelling units, e.g. to cover the last mile through multiple hops to provide, e.g. gigabit speeds to homes and/or dwelling units.

In order to provide high throughput backhaul communications, e.g. using mmWave communications, the base station devices 102A-E may include a large number of antenna elements, such as tens, hundreds, thousands, or any number of antenna elements, to implement directional beamforming. Thus, the base station devices 102A-E may implement a scalable RF communication system using multiple RFICs, e.g. as is discussed below with respect to FIG. 2.

The scalable RF communication system may include a primary RFIC, such as the primary RFICs discussed below with respect to FIGS. 3 and 4, and multiple secondary RFICs, such as the secondary RFIC discussed below with respect to FIG. 5. The primary and secondary RFICs of the scalable RF communication system may be arranged in a tiled, cascaded, or multi-level/tier fashion. For example, the primary RFIC may be considered the first level of the scalable RF communication system while the secondary RFICs may be considered the second level of the scalable RF communication system.

In the subject system, phase shifting can be distributed across the multiple levels of the scalable RF communication system. A first stage of phase shifting is performed at the first level of the scalable RF communication system, e.g. at the primary RFIC, and a second stage of phase shifting is performed at the second level of the scalable RF communication system, e.g. at the secondary RFICs. For example, a baseband processor can identify the total amount of phase shift to be applied to a given RF signal (e.g. to implement directional beamforming, and/or account for trace delays) and can determine how to optimally distribute the phase shift between the primary RFIC and the secondary RFICs. In one or more implementations, the phase shift may be distributed in a manner that minimizes adjustments at the second level, e.g. at the secondary RFICs, in order to minimize switching time. An example process of distributing phase shifts in a scalable RF communication system is discussed further below with respect to FIG. 6.

The subject system can also be used to apply distributed gain settings for the transmit and receive chains across the multiple levels of the scalable RF communication system. The subject system may include one or more measurement and/or feedback mechanisms that measure power levels at various tap points throughout the scalable RF communication system. When a measured power level at one of the tap points differs from an expected power level by more than a threshold amount, the subject system determines adjusted distributed gain settings for the appropriate components of the scalable RF communication system. For example, if the power level of two RF inputs at the primary RFIC (e.g. from two secondary RFICs) differs by more than a threshold amount, the subject system attempts to increase the gain applied by one of the secondary RFICs to the RF signal with the lower power level such that the RF signals can be combined at the primary RFIC with substantially equal power. In one or more implementations, the subject system attempts to effect the gain adjustments solely through the primary RFIC, when possible, since gain may be adjusted through the primary RFIC more rapidly than through the secondary RFICs. An example process of distributing gain settings in a scalable RF communication system is discussed further below with respect to FIG. 7.

Figure 2:
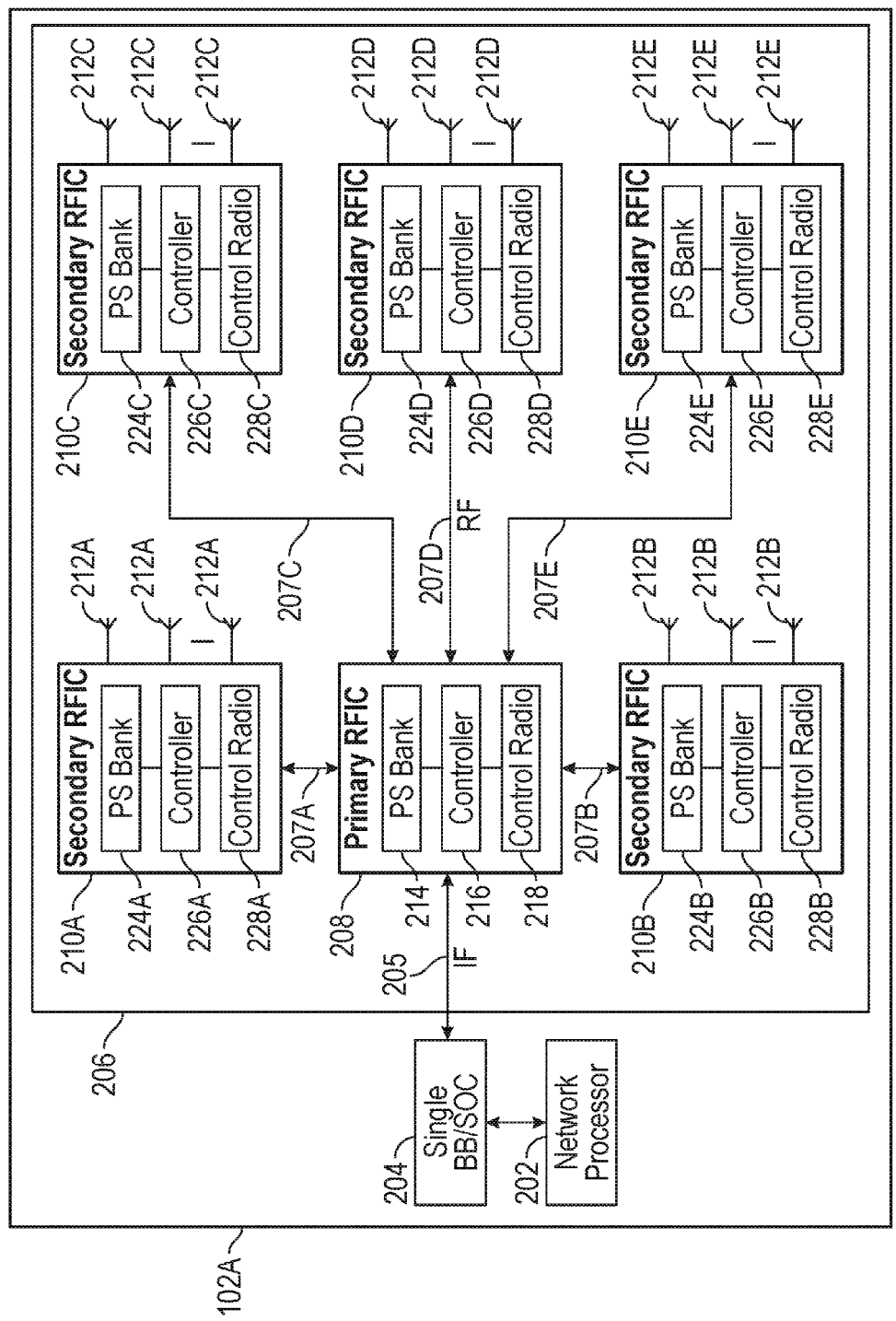
FIG. 2 illustrates an example base station device implementing a distributed dynamic configuration of a scalable radio frequency communication system in accordance with one or more implementations.

FIG. 2 illustrates an example base station device 102A implementing a distributed dynamic configuration of a scalable radio frequency communication system. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example base station device 102A includes a network processor 202, a single baseband processor 204, and the scalable RF communication system 206. The single baseband processor 204 may be, may include, and/or may be part of a system on a chip (SoC). The scalable RF communication system 206 includes a primary RFIC 208 and a number of secondary RFICs 210A-E. The primary RFIC 208 includes a phase shifter (PS) bank 214, a controller 216, and a control radio 218. Each of the secondary RFICs 210A-E includes a number of antenna elements 212A-E, one of the PS banks 224A-E, one of the controllers 226A-E, and one of the control radios 228A-E. In one or more implementations, the primary RFIC 208 may be referred to as a "master" RFIC and the secondary RFICs 210A-E may be referred to as "slave" RFICs.

For explanatory purposes, the scalable RF communication system 206 is illustrated as including five secondary RFICs 210A-E directly coupled to the primary RFIC 208. However, the scalable RF communication system 206 may include any number of secondary RFICs 210A-E directly coupled to the primary RFIC 208. Since the primary RFIC 208 is directly connected to the baseband processor 204, the primary RFIC 208 (and the PS bank 214 contained therein) may be referred to as being at and/or on a first level of the scalable RF communication system 206. Similarly, since the secondary RFICs 210A-E are indirectly coupled to the baseband processor 204 via the primary RFIC 208, the secondary RFICs 210A-E may be referred to as being at and/or on a second level of the scalable RF communication system 206.

The PS banks 214, 224A-E may each include a set of transmit phase shifters and a set of receive phase shifters corresponding to the antenna elements 212A-E. The phase shifters may each be associated with a resolution, or step size, at which the phase can be shifted (e.g. fine resolution or coarse resolution), as well as a total phase range. The phase shifters may be programmable and/or configurable, such as by the respective controllers 216, 226A-E. The controllers 216, 226A-E may be processors, processor circuits, microprocessors, microcontrollers, digital controllers, or generally any circuitry that can modify the amount gain and/or phase shift applied by each of the programmable/configurable phase shifters of the respective PS banks 214, 224A-E.

Since fine resolution phase shifters may be more expensive than course resolution phase shifters, e.g. in terms of cost, power, and/or surface area, in one or more implementations, the phase shifters of the PS bank 214 of the primary RFIC 208 may be fine resolution phase shifters, and the phase shifters of the PS banks 224A-E of the secondary RFICs 210A-E may be course resolution phase shifters. In this manner only a single high-cost fine resolution phase shifter is used for each of the secondary RFICs 210A-E. The baseband processor 204 may coordinate the phase shifters across the PS banks 214, 224A-E of the RFICs 208, 210A-E in order to accommodate performing fine resolution phase shifting at the primary RFIC 208 and coarse resolution phase shifting at the secondary RFICs 210A-E.

The baseband processor 204 is coupled to the primary RFIC 208 via a transmission media 205. The transmission media 205 may be, for example, a coaxial transmission media, or generally any transmission media that can carry an intermediate frequency (IF) signal. In one or more implementations, the baseband processor 204 is directly coupled to exclusively the primary RFIC 208 via the transmission media 205, e.g. the baseband processor 204 is not directly coupled to any of the secondary RFICs 210A-E. The primary RFIC 208 is coupled to each of the secondary RFICs 210A-E via transmission media 207A-E. The transmission media 207A-E may be, for example, a waveguide, a transmission line, or generally any transmission media that can carry an RF signal.

The control radios 218, 228A-E of the RFICs 208, 201A-E may also be communicatively coupled to one another via an out-of-band control channel that is carried over transmission media that is separate from the transmission media 207A-E. The control radios 218, 228A-E may be communicatively coupled via a ring network, a star network, or generally any network topology. The control radio 218 of the primary RFIC 208 is communicatively coupled to the baseband processor 204 via an out-of-band control channel that is carried over transmission media that is separate from the transmission media 205. However, only the control radio 218 of the primary RFIC 208 may be in direct communication with the baseband processor 204. Thus, the control radio 218 may act as a relay for the other control radios 228A-E with respect to control information received from the baseband processor 204.

The baseband processor 204 may communicate control information for one or more of the primary RFIC 208 and/or the secondary RFICs 210A-E to the primary RFIC 208 via the out-of-band control channel. The control information may include, for example, phase shifting information, gain information, power control information, or generally any control information that may be relevant to one or more of the RFICs 208, 210A-E. For example, the baseband processor 204 may determine phase shift to be applied by one of the phase shifters of the PS bank 214 of the primary RFIC 208, and by one or more of the phase shifters of the PS bank 224A of the secondary RFIC 210A. The baseband processor 204 may transmit a control message (or multiple separate control messages) that indicate the appropriate phase shifts to the primary RFIC 208, and the primary RFIC 208 forwards the control messages associated with the secondary RFIC 210A to the secondary RFIC 210A. The control radio 228A of the secondary RFIC 210A retrieves the phase shift information from the control messages and the controller 226A of the secondary RFIC 210A programmably adjusts the appropriate phase shifter of the PS bank 224A to effectuate the received phase shift.

The control information and/or messages transmitted by the baseband processor 204 may be individually addressed to one or more of the primary RFIC 208 and/or the secondary RFICs 210A-E, such as by including pages and/or identifiers corresponding to each of the RFICs 208, 210A-E in the control information and/or messages. Thus, the baseband processor 204 can transmit control information regarding phase shifts and/or gains applied by each individual phase shifter of each of the PS banks 214, 224A-E of each of the respective RFICs 208, 210A-E.

In the transmit direction, the primary RFIC 208 receives an IF signal from the baseband processor 204 via the transmission media 205, upconverts the IF signal to an RF signal, phase shifts the RF signal, amplifies the RF signal, and then transmits the RF signal to each of the secondary RFICs 210A-E via the transmission media 207A-E. The secondary RFICs 210A-E receive the RF signal from the primary RFIC 208, phase shift the RF signal (e.g. in unison to effectuate directional beamforming), amplify the RF signal, and transmit the RF signal via the antenna elements 212A-E. The phase shifters of the PS banks 224A-E of the secondary RFICs 210A-E may be switched in a synchronized manner to ensure proper functioning of beam refinement algorithms, e.g. by avoiding undesired transient variation patterns.

In order to ensure that the phase shifters can be shifted/switched in unison, the primary RFIC 208 propagates a clock signal to each of the secondary RFICs 210A-E. The clock signal may be generated by the primary RFIC 208 and/or by the baseband processor 204. Each of the secondary RFICs 210A-E may include timers that can be synchronized based at least in part on the common clock signal. Furthermore, since the transmission media 207A-E may have different trace lengths, RF signals transmitted to each of the secondary RFICs 210A-E may incur different propagation delays, which may be for example, predetermined and/or measured using a feedback mechanism. Thus, one or more of the secondary RFICs 210A-E may each apply a fixed phase shift (that may be, for example, predetermined) to each received RF signal to account for any differences in propagation delays between the secondary RFICs 210A-E. In this manner, the secondary RFICs 210A-E can be shifted/switched in unison.

In the receive direction, each of the secondary RFICs 210A-E receive RF signals via the antenna elements 212A-E, amplify the RF signals, phase shift the RF signals, combine the RF signals and transmit the combined RF signal to the primary RFIC 208 via the transmission media 207A-E. The primary RFIC 208 receives the RF signals, amplifies the RF signals, phase shifts the RF signals and combines the RF signals. The primary RFIC 208 then downconverts the combined RF signal to IF, and transmits the IF signal to the baseband processor 204 via the transmission media 205. Thus, while the primary RFIC 208 includes mixers for upconverting/downconverting, the secondary RFICs 208A-E may not include any mixers and/or may not include any active or powered mixers. An example primary RFIC 208 is discussed further below with respect to FIGS. 3 and 4 and an example secondary RFIC 210A is discussed further below with respect to FIG. 5.

For explanatory purposes, the scalable radio frequency communication system 206 of FIG. 2 is illustrated as having one tier, or one level, of separation between the primary RFIC 208 and the secondary RFICs 210A-E. However, the scalable radio frequency communication system 206 may include multiple levels and/or tiers, e.g. in a cascaded or hierarchical fashion, between the primary RFIC 208 and the secondary RFICs 210A-E. Thus, the scalable radio frequency communication system 206 may include one or more levels or tiers of intermediate RFICs between the primary RFIC 208 and the secondary RFICs 210A-E. In this manner, the phase shifting and/or AGC settings can be distributed across an even greater number of levels of the scalable radio frequency communication system 206.

In one or more implementations, one or more of the network processor 202, the baseband processor 204, the primary RFIC 208, one or more of the secondary RFICs 210A-E, one or more of the PS banks 214, 224A-E, one or more of the controllers 216, 226A-E, one or more of the control radios 218, 228A-E, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
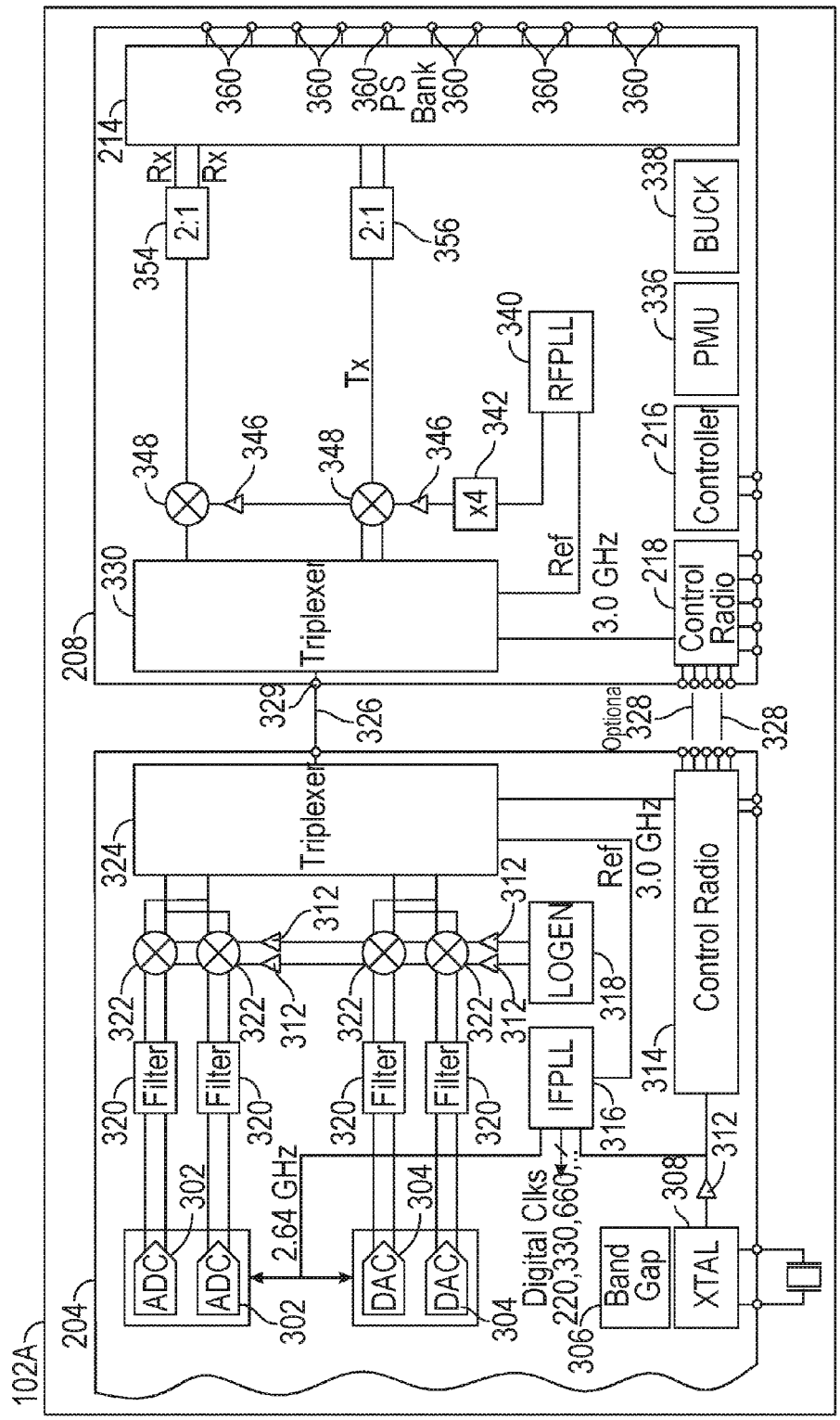
FIG. 3 illustrates an example base station device implementing a distributed dynamic configuration of a scalable radio frequency communication system in accordance with one or more implementations.

FIG. 3 illustrates an example base station device 102A implementing a distributed dynamic configuration of a scalable radio frequency communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The base station device 102A includes a baseband processor 204 and a primary RFIC 208. For explanatory purposes the baseband processor 204 and the primary RFIC 208 are illustrated as being included in the base station device 102A. However, the baseband processor 204 and/or the primary RFIC 208 may be included in one or more of the other base station devices 102B-E and/or one or more of the user devices 104A-C.

The baseband processor 204 is coupled to the primary RFIC 208 via a transmission media 326, and an optional control transmission media 328, either of which may be, for example, coaxial transmission media. The baseband processor 204 includes one or more analog to digital converters (ADCs) 302, one or more digital to analog converters (DAC) 304, a bandgap voltage reference circuit 306, a crystal oscillator 308, an amplifier 312, such as a power amplifier, a control radio 314, an intermediate frequency phase-locked loop (IFPLL) 316, a local oscillator generator (LOGEN) 318, one or more amplifiers 312, such as power amplifiers, one or more filters 320, one or more mixers 322, and a triplexer 324.

The primary RFIC 208 includes an IF communication pin 329, a triplexer 330, a control radio 218, a controller 216, a power management unit (PMU) 336, a buck regulator 338, a radio frequency phase-locked loop (RFPLL) 340, a multiplier 342, one or more amplifiers 346, such as low noise amplifiers (LNAs) or power amplifiers (PAs), a combiner circuit 354, a splitter circuit 356, a PS bank 214, and one or more communication pins 360.

The primary RFIC 208 receives an IF signal (e.g. 10.56 GHz) from the baseband processor 204, passes the IF signal through the triplexer 330 to the mixer 348, and upconverts the IF signal, by the mixer 348, to an RF signal, e.g. 28 GHz, 30 GHz, 60 GHz, 70 GHz, etc. The RF signal is passed from the mixer 348 to the splitter circuit 356, where the RF signal is split, and the resulting multiple RF signals are passed to the PS bank 214. The PS bank 214 phase shifts the RF signals, as indicated by control information received from the baseband processor 204 via the control radio 218, and transmits the RF signals via the communication pins 360. In a single chip implementation, the communication pins 360 of the primary RFIC 208 are coupled to antenna elements, and the RF signals are transmitted via the antenna elements, e.g. to an external device. In a multi-chip implementation, the communication pins 360 of the primary RFIC 208 are coupled to one or more transmission media, such as waveguides, for transmitting the RF signals to one or more of the secondary RFICs 210A-E.

Similarly, in the receive path, the primary RFIC 208 receives RF signals over the communication pins 360 from an external device or one or more secondary RFICs 208A-E. The received signals are phase shifted and/or amplified by the PS bank 214 and the RF signals are combined by the combiner circuit 354. In order to perform equal gain combining, the power levels of the RF signals may need to be approximately equal. Accordingly, when the power level of the RF signals differ by a threshold amount, the controller 216 of the primary RFIC 208 may adjust the programmable gain applied by one or more of the phase shifters of the PS bank 214. Alternatively, and/or in addition, the controller 216 may generate a control message that is transmitted, via the control radio 218, to the one of the secondary RFICs 210A-E for which the applied gain needs to be increased. The gain may then be applied at the appropriate secondary RFIC.

The primary RFIC 208 may also receive control information from the baseband processor 204 via the control radio 218 and the control transmission media 328. For example, the baseband processor 204 may transmit control information associated with the primary RFIC 208 and/or one or more secondary RFICs 210A-E coupled thereto via the control radio 314 of the baseband processor 204. The control radio 218 of the primary RFIC 208 receives the control information over the control transmission media 328. The control radio 218 and/or the controller 216 of the primary RFIC 208 determines whether the control information is addressed to the primary RFIC 208 and/or one or more secondary RFICs 210A-E coupled thereto. When the control information is addressed to one or more of the secondary RFICs 210A-E, the control radio 218 transmits the appropriate control information to the appropriate secondary RFICs via an out-of-band communication channel. In one or more implementations, the out-of-band communication channel may be separate transmission media coupled to the control radio 218 of the primary RFIC 208 and separate control radios 228A-E of each of the secondary RFICs 210A-E.

The primary RFIC 208 may also include a number of tap points where power levels can be measured and the measurements can be communicated to the controller 216. The tap points may include, for example, the RF inputs to the combiner circuit 354, the RF outputs of the splitter circuit 356, or generally any points along the transmit and/or receive paths of the primary RFIC 208. The tap points may be coupled to the controller 216, for example, by transmission lines. When the controller 216 determines that a power level measured at a given tap point differs from an expected power level (e.g. a predetermined power level) by more than a threshold amount, the controller 216 may adjust the gain applied by one or more components of the primary RFIC 208 and/or one or more of the secondary RFICs 210A-E prior to the tap point in the receive and/or transmit chain, such as one or more phase shifters of the PS bank 214. Thus, the gain and/or phase shift applied by each of the phase shifters may be configurable and/or programmable, such as digitally programmable.

In one or more implementations, the power level measurements captured at tap points of the secondary RFICs 210A-E that are coupled to the primary RFIC 208 are relayed to the controller 216 of the primary RFIC 208 via the control radio 218. The controller 216 of the primary RFIC 208 may then determine the appropriate gain adjustments for the primary RFIC 208 in addition to the secondary RFICs 210A-E. Alternatively, and/or in addition, the power level measurements of the primary RFIC 208 and/or of any secondary RFICs 210A-E coupled thereto, may be relayed back to the baseband processor 204. The baseband processor 204 may then determine the appropriate gain settings adjustments based at least in part on the received power level measurements and may communicate the adjustments to the primary RFIC 208 via the control radio 314. The primary RFIC 208 may relay any gain adjustments to the appropriate secondary RFICs 210A-E.

In one or more implementations, one or more of the baseband processor 204, the ADCs 302, the DACs 304, the bandgap voltage reference circuit 306, the crystal oscillator 308, the amplifiers 312, the control radio 314, the IFPLL 316, the LOGEN 318, the filters 320, the mixers 322, the triplexer 324, the primary RFIC 208, the triplexer 330, the control radio 218, the controller 216, the PMU 336, the buck regulator 338, the RFPLL 340, the multiplier 342, the amplifiers 346, the combiner circuit 354, the splitter circuit 356, the PS bank 214, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 4:
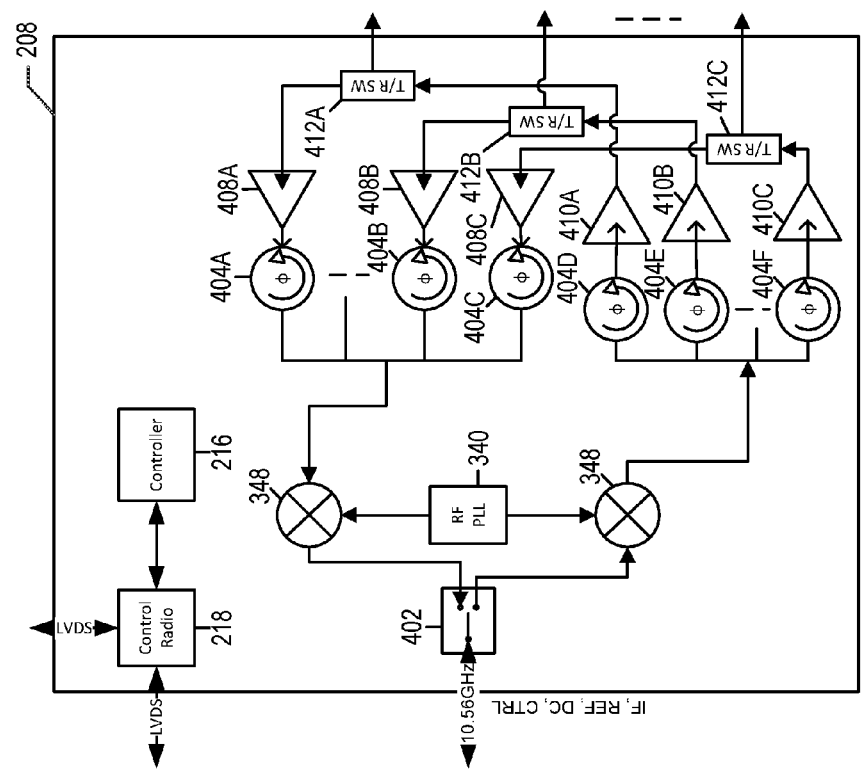
FIG. 4 illustrates a primary RFIC that may be implemented in a distributed dynamic configuration of a scalable radio frequency communication system in accordance with one or more implementations.

FIG. 4 illustrates a primary RFIC 208 that may be implemented in a distributed dynamic configuration of a scalable radio frequency communication system 206 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The primary RFIC 208 of FIG. 4 is similar to the primary RFIC 208 of FIG. 3, with additional detail illustrated with respect to the PS bank 214 of FIG. 3. The primary RFIC 208 includes the control radio 218, the RFPLL 340, the mixers 348, a switch 402, receive phase shifters 404A-C, transmit phase shifters 404D-F, power amplifiers 410A-C, transmit/receive switches 412A-C, and low noise amplifiers (LNAs) 408A-C. The phase shifters 404A-F may be configurable phase shifters, programmable phase shifters, steerable phase shifters, or generally any phase shifters that can implement directional beamforming. Thus, the phase shifters 404A-F may each have a resolution, or step size, by which the phase can be shifted, such as, for example, 0.8 degrees, and may each be able to provide a specific phase range, such as, for example, 0 to 60 degrees. The gain applied by the phase shifters 404A-F, LNAs 408A-C, and power amplifiers 410A-C may also be configurable/adjustable, such as digitally programmable.

The controller 216 may be communicatively coupled to one or more of the phase shifters 404A-F, the power amplifiers 410A-C, and the LNAs 408A-C, such that the controller 216 can individually adjust, control, and/or program the gain and/or phase shift applied by each of the phase shifters 404A-F, the gain applied by each of the power amplifiers 410A-C, and the gain applied by each of the LNAs 408A-C. The controller 216 may also be coupled to one or more tap points throughout the transmit/receive chain where power levels are measured and communicated to the controller 216.

The control radio 218 receives control information from the baseband processor 204, e.g. via low voltage differential signaling (LVDS). If the control information is addressed to the primary RFIC 208, the primary RFIC 208 adjusts/programs one or more components based at least in part on the control information. For example, the controller 216 may adjust the phase shift applied by one or more of the phase shifters 404A-F and/or may adjust the gain applied by one or more of the phase shifters 404A-F, the power amplifiers 410A-C, and the LNAs 408A-C appropriately. If the control information is addressed to one or more secondary RFICs 210A-E coupled to the primary RFIC 208, the control radio 218 transmits the control information to the appropriate one or more secondary RFICs 210A-E, e.g. via LVDS.

In one or more implementations, one or more of the primary RFIC 208, the control radio 218, the switch 402, the RFPLL 340, the mixers 348, the phase shifters 404A-E, the power amplifiers 410A-C, the transmit/receive switches 412A-C, the LNAs 408A-C, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 5:
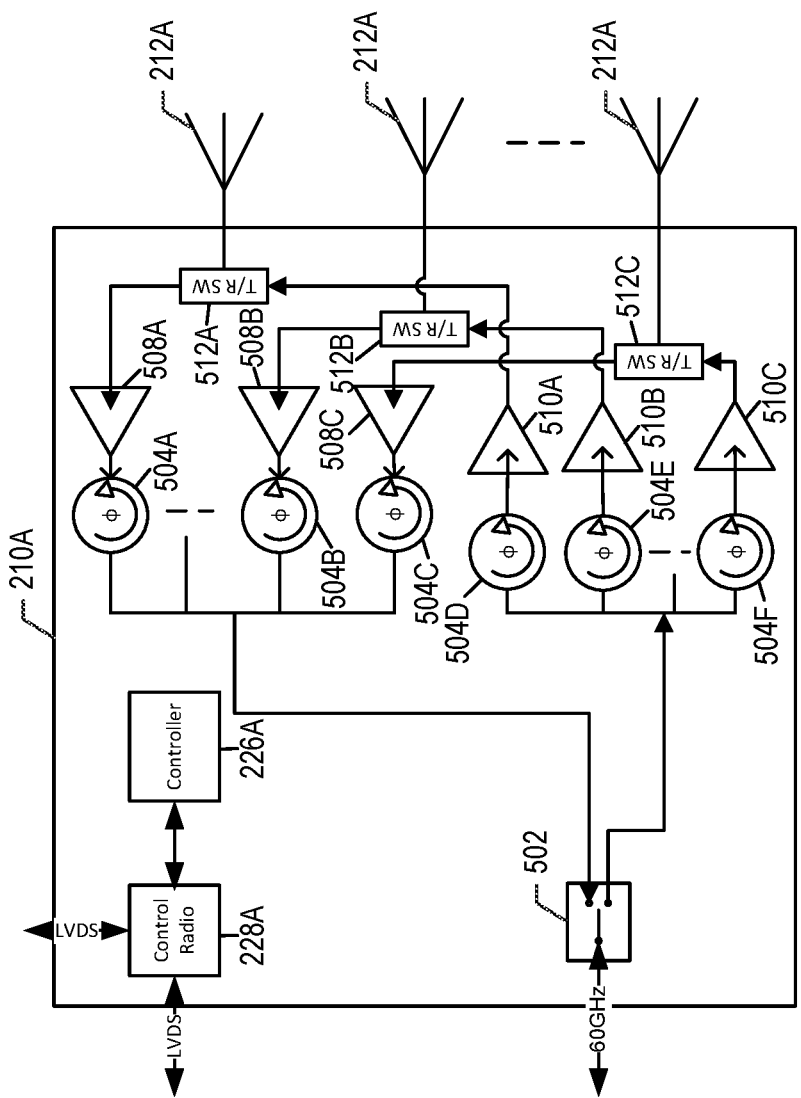
FIG. 5 illustrates a secondary RFIC that may be implemented in a distributed dynamic configuration of a scalable radio frequency communication system in accordance with one or more implementations.

FIG. 5 illustrates a secondary RFIC 210A that may be implemented in a distributed dynamic configuration of a scalable radio frequency communication system 206 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The secondary RFIC 210A includes the control radio 228A, the controller 226A, a switch 502, receive phase shifters 504A-C, transmit phase shifters 504D-F, power amplifiers 510A-C, transmit/receive switches 512A-C, and LNAs 508A-C. The phase shifters 504A-F may be configurable phase shifters, programmable phase shifters, steerable phase shifters, or generally any phase shifters that can implement directional beamforming. Thus, the phase shifters 504A-F may each have a resolution, or step size, by which the phase can be shifted, such as, for example, 0.8 degrees, and may each be able to provide a specific range of phase shift, such as, for example, 0 to 60 degrees. The gain applied by the phase shifters 504A-F, the LNAs 508A-C, and power amplifiers 510A-C may also be configurable/adjustable, such as digitally programmable.

The controller 216 may be communicatively coupled to one or more of the phase shifters 504A-F, the power amplifiers 510A-C, and the LNAs 508A-C, such that the controller 226A can individually adjust, control, and/or program the gain and/or phase shift applied by each of the phase shifters 504A-F, the gain applied by each of the power amplifiers 510A-C, and the gain applied by each of the LNAs 508A-C. The controller 226A may also be coupled to one or more tap points throughout the transmit/receive chain where power levels are measured and communicated to the controller 226A.

In the receive direction, the secondary RFIC 210A receives RF signals via the antenna elements 212A, amplifies the received RF signals using the LNAs 508A-C, phase shifts the received RF signals using the phase shifters 504A-C, combines the received RF signals and transmits the combined RF signal to the primary RFIC 208 via the switch 502. In the transmit direction, the secondary RFIC 210A receives an RF signal from the primary RFIC 208, splits the received RF signal, into a number of RF signals, phase shifts the RF signals using the appropriate transmit phase shifters 510A-C, amplifies the RF signals using the power amplifiers 510A-C, and transmits the RF signals via the antenna elements 212A.

The control radio 218 receives control information from the primary RFIC 208 and/or another one of the secondary RFICs 210B-E, e.g. via LVDS. If the control information is addressed to the secondary RFIC 210A, the controller 226A adjusts and/or programs one or more components of the secondary RFIC 210A based at least in part on the control information. For example, the controller 226A may adjust the phase shift applied by one or more of the phase shifters 404A-F and/or may adjust the gain applied by one or more of the phase shifters 404A-F, the power amplifiers 410A-C, and the LNAs 408A-C appropriately. If the control information is addressed to one or more other secondary RFICs 210B-E (e.g. in a ring topology), the control radio 228A transmits the control information to the appropriate (and/or subsequent) one or more secondary RFICs 210B-E, e.g. via LVDS.

In one or more implementations, one or more of the secondary RFIC 210A, the control radio 228A, the controller 226A, the switch 502, the phase shifters 504A-F, the power amplifiers 510A-C, the transmit/receive switches 512A-C, the LNAs 508A-C, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 6:
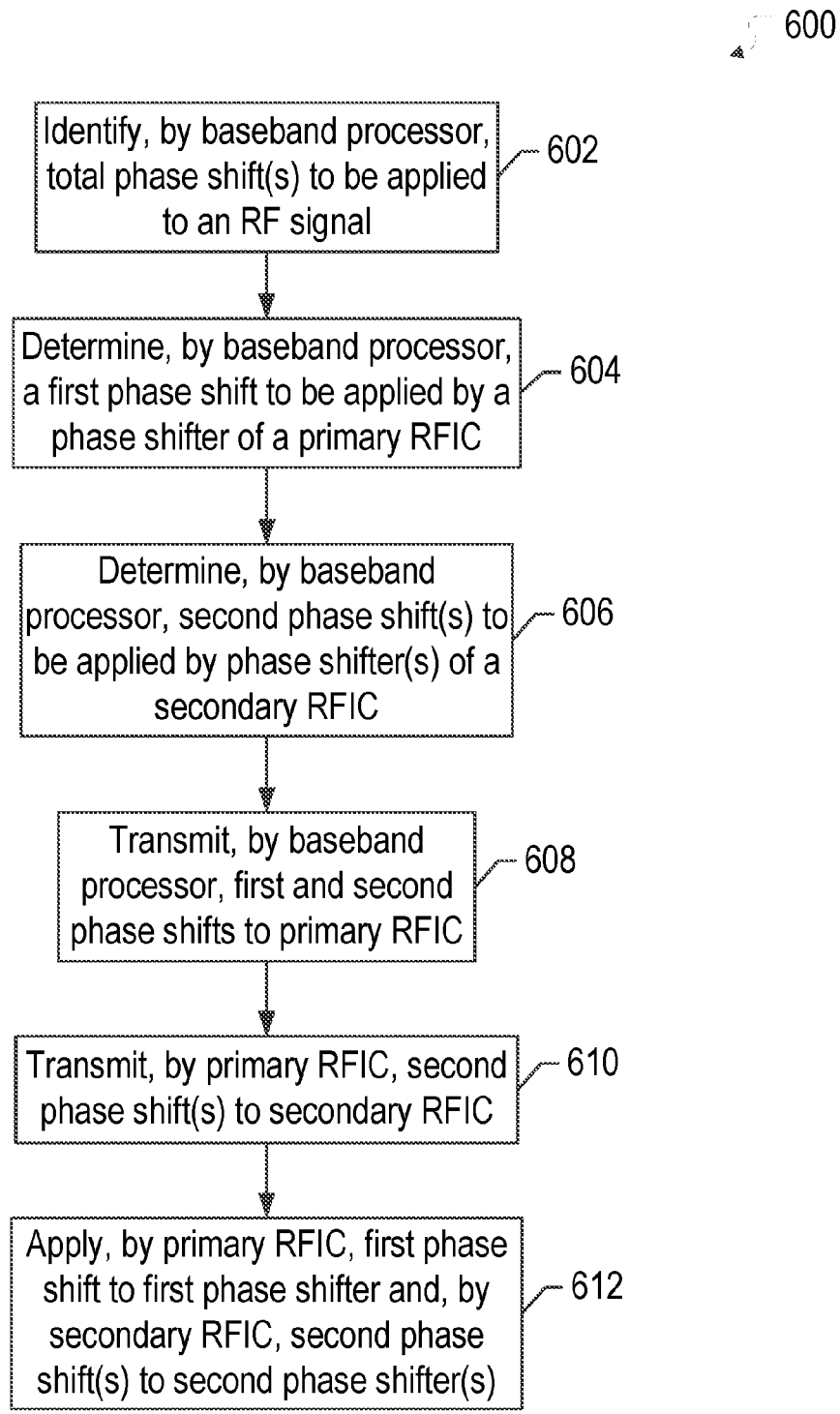
FIG. 6 illustrates a flow diagram of an example process of a distributed dynamic phase shift configuration of a scalable radio frequency communication system in accordance with one or more implementations.

FIG. 6 illustrates a flow diagram of an example process 600 of a distributed dynamic phase shift configuration of a scalable radio frequency communication system 206 in accordance with one or more implementations. For explanatory purposes, the example process 600 is described herein with reference to the scalable radio frequency communication system 206 of FIG. 2; however, the example process 600 is not limited to the scalable radio frequency communication system 206 of FIG. 2. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

The baseband processor 204 identifies total phase shifts to be applied to one or more RF signals transmitted by one or more of the secondary RFICs 210A-E, such as the secondary RFIC 210A (602). For example, the baseband processor 204 may determine the appropriate phase shift to apply to each of the RF signals transmitted via the antenna elements 212A of the secondary RFIC 210A in order to perform directional beamforming. The direction of the beamforming may be determined by the baseband processor 204, for example, based on the location of a device receiving the transmitted RF signals, such as one of the user devices 104A-C.

The baseband processor 204 then determines a first phase shift of the total phase shifts that will be applied by a transmit phase shifter 404D of the primary RFIC 208 (604) and second phase shifts of the total phase shifts to be applied by one or more transmit phase shifters 504D-F of the secondary RFIC 210A (606). The baseband processor 204 may determine the first and second phase shifts based at least in part on the resolutions and/or step sizes at which each of the transmit phase shifters 404D, 504D-F can phase shift, and phase ranges across which each of the transmit phase shifters 404D, 504D-F can phase shift. The baseband processor 204 may also determine the first and second phase shifts such that switching time is minimized, such that the amount of phase shift applied at the secondary RFIC 210A is minimized, and/or such that the total number of phase shifters being adjusted is minimized. The total phase shift may be equal to the sum of the first phase shift and the second phase shift.

After determining the first and second phase shifts, the baseband processor 204 transmits the first and second phase shifts to the primary RFIC 208, e.g. via the control radio 314 (608). The primary RFIC 208 receives the first and second phase shifts via the control radio 218 and transmits the one or more second phase shifts to the secondary RFIC 210A via the control radio 218 (610). The controller 216 of the primary RFIC 208 adjusts the transmit phase shifter 404D based on the first phase shift received from the baseband processor 204, and in unison the secondary RFIC 210A adjusts one or more of the transmit phase shifters 504D-F based on the one or more second phase shifts received from the primary RFIC 208 (612).

Figure 7:
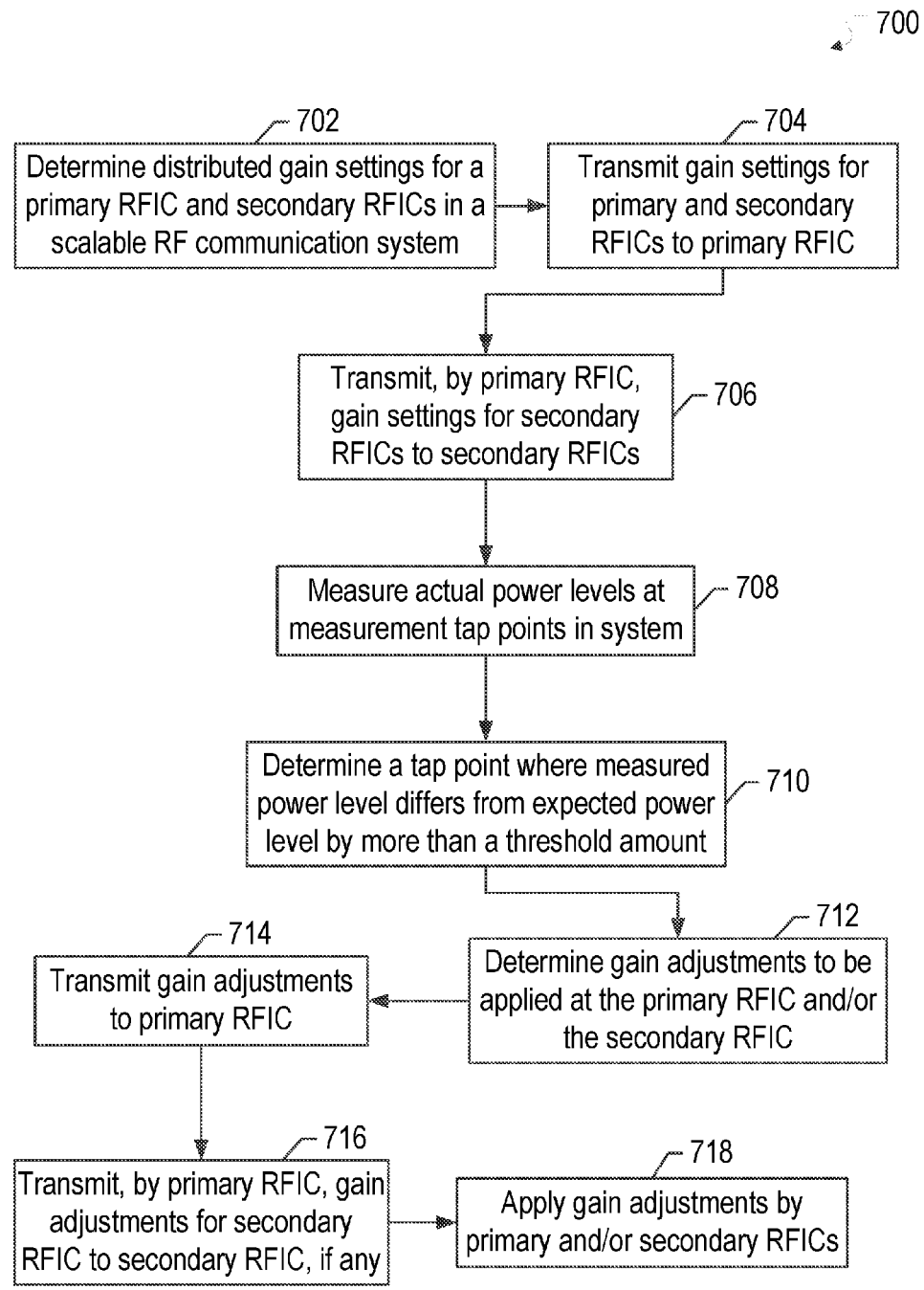
FIG. 7 illustrates a flow diagram of an example process of a distributed dynamic gain setting of a scalable radio frequency communication system in accordance with one or more implementations.

FIG. 7 illustrates a flow diagram of an example process 700 of a distributed dynamic gain setting of a scalable radio frequency communication system 206 in accordance with one or more implementations. For explanatory purposes, the example process 700 is described herein with reference to the scalable radio frequency communication system 206 of FIG. 2; however, the example process 700 is not limited to the scalable radio frequency communication system 206 of FIG. 2. Further for explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed.

The baseband processor 204 determines initial distributed gain settings of the components of the primary RFIC 208 and the one or more secondary RFICs 210A-E in the scalable RF communication system 206 (702). The initial distributed gain settings may be predetermined, such as based on the expected performance of the scalable RF communication system 206. The baseband processor 204 transmits the gain settings for the components of the primary RFIC 208 and the one or more secondary RFICs 210A-E to the primary RFIC 208 via the control radio 314 (704). The baseband processor 204 may transmit multiple control messages, each of which is addressed to the primary RFIC 208 or one of the secondary RFICs 210A-E.

The primary RFIC 208 receives the control messages from the baseband processor 204 via the control radio 218, and the primary RFIC 208 forwards the control messages that contain gain settings for the components of the one or more secondary RFICs 210A-E to the one or more secondary RFICs 210A-E via the control radio 218. The controller 216 of the primary RFIC 208 and the one or more controllers 226A-E of the one or more secondary RFICs 210A-E apply the gain settings to the appropriate components, such as one or more phase shifters, LNAs, power amplifiers, etc.

The controller 216 and the one or more controllers 226A-E then measure the actual power levels at various measurement tap points throughout the scalable RF communication system 206 (706). The controller 216 and the one or more controllers 226A-E may individually monitor actual power levels at tap points within the respective RFICs 208, 210A-E, or the measurement information may be transmitted to, and aggregated at, the controller 216 and/or the baseband processor 204 (708). The baseband processor 204 and/or one or more of the controllers 216, 226A-E determines a tap point where the measured power level differs from the expected power level by more than a threshold amount (710). If the tap point is determined by one of the controllers 216, 226A-E, such as the controller 216, the controller 216 may transmit a control message to the baseband processor 204 that identifies the tap point and the amount by which the measured power level differs from the expected power level.

The expected power level may be predetermined and known a priori to the baseband processor 204 and/or controllers 216, 226A-E, and or the expected power level may be determined based on one or more operational variables of the scalable RF communication system 206. For example, two or more input RF signals that are being combined may be expected to have power levels that are within a threshold amount.

The baseband processor 204 determines one or more gain adjustments to be applied to one or more components of the primary RFIC 208 and/or one or more of the secondary RFICs 210A-E in order to increase the measured power level at the tap point (712). For example, the baseband processor 204 may identify one or more upstream components feeding the lower power RF signal to the combiner. The baseband processor 204 transmits the determined gain adjustments to the primary RFIC 208 via the control radio 314 (714), such as via one or more control messages. The primary RFIC 208 receives the control messages containing the gain adjustments and determines whether any of the control messages are addressed to any of the secondary RFICs 210A-E. If any of the control messages are addressed to one or more of the secondary RFICs 210A-E, the primary RFIC 208 forwards the control messages to the one or more secondary RFICs 210A-E via the control radio 218 (716). The controller 216 of the primary RFIC 208, and/or one or more controllers 226A-E of one or more of the secondary RFICs 210A-E, apply the gain adjustments as indicated in the control information provided by the baseband processor 204 (718).

Figure 8:
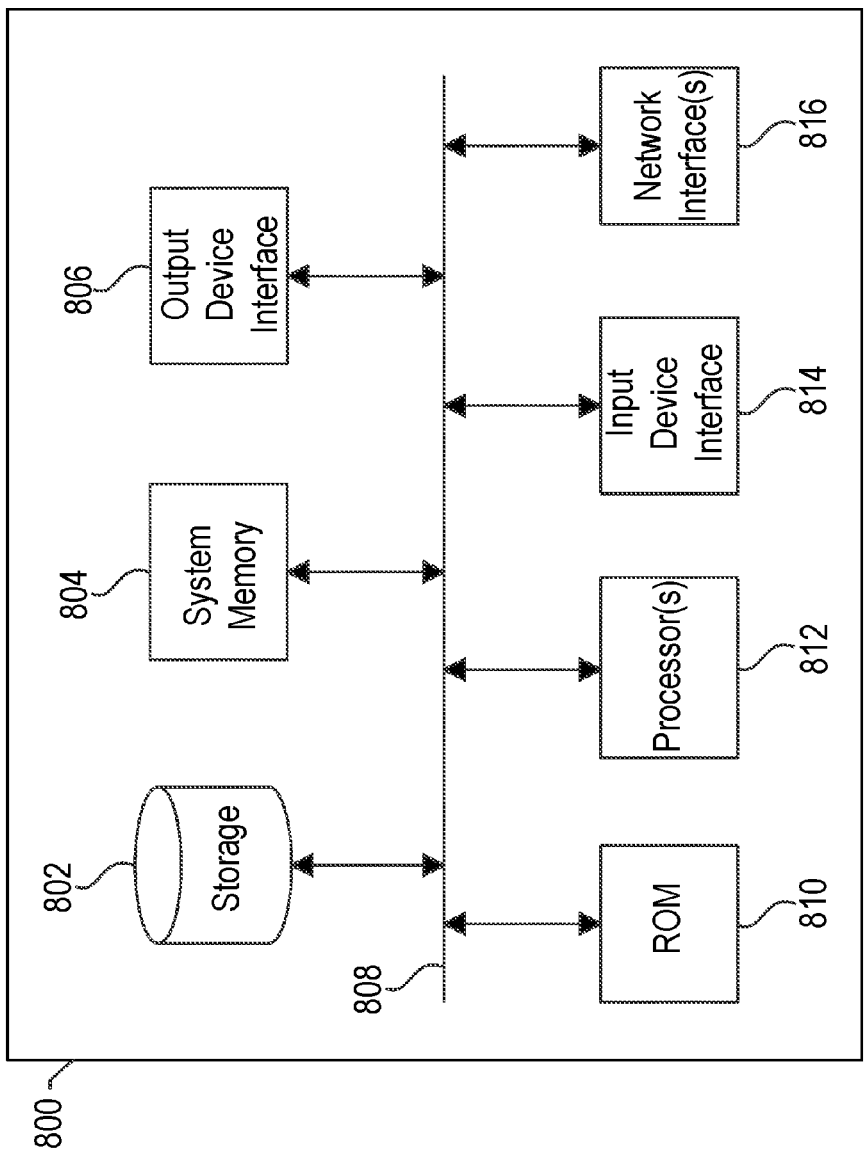
FIG. 8 conceptually illustrates an electronic system with which one or more implementations of the subject technology may be implemented.

FIG. 8 conceptually illustrates an electronic system 800 with which one or more implementations of the subject technology may be implemented. The electronic system 800, for example, may be, or may be coupled to, a powertrain system, a chassis system, a telematics system, an entertainment system, a camera system, a sensor system, such as a lane departure system, a diagnostics system, a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 800 can be, and/or can be a part of, one or more of the base station devices 102A-E and/or the user devices 104A-C. Such an electronic system includes various types of computer readable media and interfaces for various other types of computer readable media. The electronic system 800 includes a bus 808, one or more processor(s) 812, a system memory 804 or buffer, a read-only memory (ROM) 810, a permanent storage device 802, an input device interface 814, an output device interface 806, and one or more network interface(s) 816, or subsets and variations thereof.

The bus 808 collectively represents all system, peripheral, and chipset buses that communicatively connect the numerous internal devices of the electronic system 800. In one or more implementations, the bus 808 communicatively connects the one or more processor(s) 812 with the ROM 810, the system memory 804, and the permanent storage device 802. From these various memory units, the one or more processor(s) 812 retrieve instructions to execute and data to process in order to execute the processes of the subject disclosure. The one or more processor(s) 812 can be a single processor or a multi-core processor in different implementations.

The ROM 810 stores static data and instructions that are needed by the one or more processor(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processor(s) 812 may need at runtime. In one or more implementations, the processes of the subject disclosure are stored in the system memory 804, the permanent storage device 802, and/or the ROM 810. From these various memory units, the one or more processor(s) 812 retrieve instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by the electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 8, the bus 808 also couples the electronic system 800 to one or more networks (not shown) through one or more network interface(s) 816. One or more network interface(s) may include an Ethernet interface, a WiFi interface, a cellular interface, a mmWave interface, a reduced gigabit media independent interface (RGMII), or generally any interface for connecting to a network. The one or more network interfaces 816 may include, or may be coupled to, a physical layer module. In this manner, the electronic system 800 can be a part of one or more networks of computers (such as a local area network ("LAN"), a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
   an out-of-band control channel; and
   a primary radio frequency integrated circuit (RFIC) configured to:
      receive a first RF signal from a first secondary RFIC, and a second RF signal from a second secondary RFIC
      identify that a first power level of the first RF signal is greater than a second power level of the second RF signal by more than a threshold amount;
      determine a gain to be applied to the second RF signal at the second secondary RFIC such that the second power level of the second RF signal will be within the threshold amount of the first power level; and
      transmit the gain to the second secondary RFIC via an out-of-band control channel.

2. The device of claim 1, wherein the second secondary RFIC comprises a phase shifter and the second secondary RFIC is configured to apply the gain to the second RF signal via the phase shifter of the second secondary RFIC.

3. The device of claim 2, wherein the primary RFIC is further configured to:
  combine the first RF signal and the second RF signal to form a combined RF signal after the gain has been applied to the second RF signal by the second secondary RFIC.

4. The device of claim 2, wherein the second secondary RFIC further comprises a controller that is configured to programmably adjust the phase shifter based at least in part on the gain.

5. The device of claim 1, wherein the primary RFIC is further configured to:
  downconvert the combined RF signal to an intermediate frequency (IF) signal; and
  transmit the IF signal to a baseband processor.

6. The device of claim 5, wherein the primary RFIC is coupled to the baseband processor via a coaxial transmission media, and the primary RFIC is configured to transmit the IF signal to the baseband processor via the coaxial transmission media.

7. The device of claim 6, wherein the primary RFIC is configured to receive the second RF signal from the second secondary RFIC via transmission media that is separate from the coaxial transmission media and the out-of-band control channel.

8. A method comprising:
  receiving, at a primary radio frequency integrated circuit (RFIC), a first RF signal from a first secondary RFIC, and a second RF signal from a second secondary RFIC;
  identifying that a first power level of the first RF signal is greater than a second power level of the second RF signal by more than a threshold amount;
  determining a gain to be applied to the second RF signal at the second secondary RFIC such that the second power level of the second RF signal will be within the threshold amount of the first power level; and
  transmitting the gain to the second secondary RFIC via an out-of-band control channel.

9. The method of claim 8, wherein the second secondary RFIC applies the gain to the second RF signal via a phase shifter of the second secondary RFIC.

10. The method of claim 9, further comprising:
  combining, by the primary RFIC, the first RF signal and the second RF signal after the gain has been applied to the second RF signal by the second secondary RFIC.

11. The method of claim 9, wherein the second secondary RFIC further comprises a controller that is configured to programmably adjust the phase shifter based at least in part on the gain.

12. The method of claim 8, further comprising:
  downconverting, by the primary RFIC, the combined RF signal to an intermediate frequency (IF) signal; and
  transmitting, by the primary RFIC, the IF signal to a baseband processor.

13. The method of claim 12, wherein the primary RFIC is coupled to the baseband processor via a coaxial transmission media, and the primary RFIC is configured to transmit the IF signal to the baseband processor via the coaxial transmission media.

14. The method of claim 13, wherein the primary RFIC is configured to receive the second RF signal from the second secondary RFIC via transmission media that is separate from the coaxial transmission media and the out-of-band control channel.

15. A computer program product comprising code stored in a non-transitory computer-readable storage medium, the code comprising:
  code to receive, at a primary radio frequency integrated circuit (RFIC), a first RF signal from a first secondary RFIC, and a second RF signal from a second secondary RFIC;
  code to identify that a first power level of the first RF signal is greater than a second power level of the second RF signal by more than a threshold amount;
  code to determine a gain to be applied to the second RF signal at the second secondary RFIC such that the second power level of the second RF signal will be within the threshold amount of the first power level; and
  code to transmit the gain to the second secondary RFIC via an out-of-band control channel.

16. The computer program product of claim 15, wherein the second secondary RFIC applies the gain to the second RF signal via a phase shifter of the second secondary RFIC.

17. The computer program product of claim 16, the code further comprising:
  code to combine, by the primary RFIC, the first RF signal and the second RF signal after the gain has been applied to the second RF signal by the second secondary RFIC.

18. The computer program product of claim 16, wherein the second secondary RFIC further comprises a controller that is configured to programmably adjust the phase shifter based at least in part on the gain.

19. The computer program product of claim 15, wherein the code further comprises:
  code to downconvert, by the primary RFIC, the combined RF signal to an intermediate frequency (IF) signal; and
  code to transmit, by the primary RFIC, the IF signal to a baseband processor.

20. The computer program product of claim 19, wherein the primary RFIC is coupled to the baseband processor via a coaxial transmission media, and the primary RFIC transmits the IF signal to the baseband processor via the coaxial transmission media.

* * * * *